United States Patent
Miyazaki et al.

(10) Patent No.: US 10,600,541 B2
(45) Date of Patent: Mar. 24, 2020

(54) COMPRESSION-BONDED MAGNET WITH CASE AND METHOD FOR PRODUCING THE SAME

(71) Applicant: NTN CORPORATION, Osaka (JP)

(72) Inventors: Shinji Miyazaki, Mie (JP); Takuji Harano, Mie (JP); Tatsuo Nakajima, Aichi (JP)

(73) Assignee: NTN CORPORATION, Osaka (JP)

( * ) Notice: Subject to any disclaimer, the term of this patent is extended or adjusted under 35 U.S.C. 154(b) by 201 days.

(21) Appl. No.: 15/785,400

(22) Filed: Oct. 16, 2017

(65) Prior Publication Data

US 2018/0040405 A1 Feb. 8, 2018

Related U.S. Application Data

(62) Division of application No. 15/104,224, filed as application No. PCT/JP2014/082614 on Dec. 10, 2014, now Pat. No. 9,818,521.

(30) Foreign Application Priority Data

Dec. 13, 2013 (JP) .................. 2013-258187
Jan. 31, 2014 (JP) .................. 2014-017183

(51) Int. Cl.
- H01F 7/02 (2006.01)
- C22C 38/00 (2006.01)
- B23K 35/36 (2006.01)
- H01F 1/057 (2006.01)

(Continued)

(52) U.S. Cl.
CPC ............. H01F 7/021 (2013.01); B22F 3/02 (2013.01); B23K 35/3613 (2013.01);
(Continued)

(58) Field of Classification Search
CPC .......... B22F 3/02; C22C 33/02; C22C 38/00; H01F 7/02; H01F 1/057; H01F 1/08;
(Continued)

(56) References Cited

U.S. PATENT DOCUMENTS 5,278,497 A * 1/1994 Ariyoshi ............... G01R 33/09
324/207.21
2007/0256759 A1* 11/2007 Matsukawa ............ B22F 3/225
148/101

(Continued)

FOREIGN PATENT DOCUMENTS

| CN | 1162827 A | 10/1997 |
|---|---|---|
| CN | 202887897 U | 4/2013 |
| JP | 06-279807 A | 10/1994 |
| JP | 2002-012818 A | 1/2002 |
| JP | 2003-201334 A | 7/2003 |

OTHER PUBLICATIONS

English Abstract for JP 2002-012818 A dated Jan. 15, 2002.
(Continued)

*Primary Examiner* — Bernard Rojas
(74) *Attorney, Agent, or Firm* — Hedman & Costigan, P.C.; James V. Costigan; Kathleen A. Costigan

(57) ABSTRACT

There is provided a compression-bonded magnet with a case, which can realize high magnetic properties, high corrosion resistance and high durability strength even at low cost. The compression-bonded magnet with a case is a compression-bonded magnet with a case 1, comprising: a compression-bonded magnet 2 comprising a rare earth magnet powder such as an isotropic Nd—Fe—B magnet powder and a resin binder of a thermosetting resin; a case 3 for inserting the compression-bonded magnet 2; and a sealing member 4, wherein the compression-bonded magnet 2 is formed by compression-molding a mixture comprising the rare earth magnet powder and the resin binder into a green compact and curing the resin binder contained in the green compact, the rare earth magnet powder is contained in a large amount with respect to the entire compression-bonded magnet (for example, in a volume ratio of 85% to 90%), the sealing member 4 is fixed at an insertion opening part 3*a* of the case 3, and the compression-bonded magnet 2 is hermetically sealed by the sealing member 4 and the case 3.

13 Claims, 4 Drawing Sheets

(51) Int. Cl.
  *H01F 41/02* (2006.01)
  *B22F 3/02* (2006.01)
  *C22C 33/02* (2006.01)
  *G01D 5/14* (2006.01)

(52) U.S. Cl.
  CPC ............. *C22C 33/02* (2013.01); *C22C 38/00* (2013.01); *G01D 5/14* (2013.01); *H01F 1/0576* (2013.01); *H01F 1/0578* (2013.01); *H01F 7/0221* (2013.01); *H01F 41/026* (2013.01); *H01F 41/0266* (2013.01); *C22C 2202/02* (2013.01); *G01D 5/145* (2013.01)

(58) Field of Classification Search
  CPC ........ H01F 41/02; H01F 1/0576; H01F 7/021; H01F 41/0266
  See application file for complete search history.

(56) References Cited

U.S. PATENT DOCUMENTS

2008/0124235 A1* 5/2008 Honkura ................ F04D 5/002
                                                  417/423.14
2011/0234346 A1* 9/2011 Honkura ............... H01F 1/0578
                                                  335/302

OTHER PUBLICATIONS

English Abstract for JP 2003-201334 A dated Jul. 18, 2003.
English Machine Translation for JP 06-279807 A dated Oct. 4, 1994.
English Abstract for CN 202887897 U dated Apr. 17, 2013.
English Abstract for CN 1162827 A dated Oct. 22, 1997.

* cited by examiner (a)

(b)

(a)

(b)

(c)

(d)

COMPRESSION-BONDED MAGNET WITH CASE AND METHOD FOR PRODUCING THE SAME

This application is a divisional application of Ser. No. 15/104,224, filed Jun. 13, 2016 which is a national stage application of PCT/JP2014/082614, filed Dec. 10, 2014, which claims the priority of Japanese Patent Application Serial No. 2013-258187, filed Dec. 13, 2013 and Japanese Patent Application Serial No. 2014-017183, filed Jan. 31, 2014.

TECHNICAL FIELD

The present invention relates to a compression-bonded magnet with a case, for use in a sensor detecting the angle in a non-contact manner, and, particularly, to a compression-bonded magnet with a case, for use in a corrosive environment in which it is in contact with a fluid such as water, oil or exhaustive gas and is required to have corrosion resistance, and to a method for producing the same.

BACKGROUND ART

Bonded magnets molded by binding magnet powders of a rare earth alloy by means of a resin binder contain the resin binder and thus have poorer magnetic properties than those of binderless sintered magnets, but are easy to process into any shape and also excellent in dimensional accuracy, and therefore are used in various applications. For example, as regards their use in sensors detecting the angle in a non-contact manner, bonded magnets are utilized as sensor magnets detecting the opening/closing angle in flow channel switching valves for water pumps for effectively cooling engines, inverters, batteries, etc. of HEVs and EVs, oil pumps, fuel pumps and the like in the automobile field, and are utilized as sensor magnets for detection of the absolute angle in robots in the industrial machinery field.

Bonded magnets are classified into those obtained by charging a mixture comprising a magnet powder and a resin binder such as a thermosetting epoxy resin into a mold for compression molding thereof (compression-bonded magnets) and those obtained by pelletizing a mixture of a magnet powder and a thermoplastic resin binder and injection-molding this pelletized mixture. Compression-bonded magnets can contain a large amount of magnet powder as compared with injection-molded magnets, and thus can attain high magnetic properties.

When rare earth magnet powders are used in bonded magnets, the magnets contain iron or a rare earth element, and thus involve the problem of internal penetration of rust, or are likely to be deteriorated in magnetic properties by oxidation corrosion. Especially, such problems become pronounced in a corrosive environment in which the bonded magnets are in contact with a fluid such as water. Therefore, in the bonded magnet, a resin coating is formed on an exposed surface of the magnet, for example, by electrodeposition coating, electrostatic coating or spray coating to cope with the above problems.

Conventionally, there has been proposed a compression-bonded magnet production method in which a rust-proof thermosetting coating is formed on the surface of a rare earth magnet by an immersion method (see Patent Document 1). This production method involves repeating a cycle of immersion, drying and curing twice to six times to form a rust-proof thermosetting coating with a size of 0.005 mm to 0.05 mm on the surface of a magnet while impregnating a resin into the voids formed in the magnet.

PRIOR ART DOCUMENTS

Patent Documents

Patent Document 1: JP 2002-260943 A

SUMMARY OF THE INVENTION

Problem to be Solved by the Invention

In recent years, small-sized sensors, which are used in an environment in which they are in contact with a fluid such as water, oil or exhaustive gas and are required to have corrosion resistance, are demanded to have higher magnetic properties while securing excellent corrosion resistance and moldability. However, conventional compression-bonded magnets including one described in Patent Document 1 can contain a large amount of a magnet powder as compared with injection-molded magnets, but the amount of the magnet powder is at most about 83% in volume ratio with respect to the entire magnet. The magnetic properties of this compression-bonded magnet may sometimes be difficult to deal with the above requirement. There is a possibility that the durability strength of the magnet itself as a compression-molded body and the strength of adhesion, for example, to a case which holds the magnet cannot be maintained during use, simply by decreasing the resin binder amount and increasing the magnet powder amount more than the normal limit amount (83%) in order to improve the magnetic properties.

On the other hand, it is conceivable to replace bonded magnets with binderless magnets (sintered magnets) having higher magnetic properties. The binderless magnets, however, must be produced through the steps of compression-molding a magnet powder of a rare earth alloy or the like at an ultrahigh pressure and, thereafter, thermally treating the compression-molded body at a high temperature (for example, 500° C. or higher) in a vacuum furnace, so that a higher production cost is needed than that for production of compression-bonded magnets. Also, the magnetic properties are likely to be lowered by heat treatment at a high temperature. Further, since the binderless magnets are intended for use in a corrosive environment, it is additionally necessary to form the above-mentioned resin coating on the surface of this rare earth magnet or to form a metal coating by electroplating or metal vapor deposition.

As the kinds of rare earth magnet powders, anisotropic magnets can be used to realize higher magnetic properties than those attained by using isotropic magnets, but must undergo magnetic field orientation molding by using a magnetic field molding machine. Therefore, the production cost becomes high.

The production method of Patent Document 1 involves a separate step of forming a rust-proof thermosetting coating after formation of the magnet, and also involves repeating immersion treatment in a plurality of times, and thus includes many production steps, provides poor productivity, and requires a high production cost.

The present invention has been made in order to deal with such problems, and an object thereof is to provide a compression-bonded magnet with a case, which can realize high magnetic properties, high corrosion resistance and high durability strength even at low cost, and also to provide a production method which enables production of a compression-bonded magnet with a case having such properties with high productivity and at low cost.

Means for Solving the Problem

The compression-bonded magnet with a case according to the present invention is a compression-bonded magnet with a case, which comprises a compression-bonded magnet including a rare earth magnet powder and a resin binder of a thermosetting resin, a case for inserting the compression-bonded magnet, and a sealing member, and is characterized in: that the compression-bonded magnet is formed by compression-molding a mixture comprising the rare earth magnet powder and the resin binder into a green compact and curing the resin binder in the green compact; that the sealing member is fixed at an insertion opening part for the compression-bonded magnet provided in the case; and that the compression-bonded magnet is hermetically sealed by the sealing member and the case. The compression-bonded magnet with a case is also characterized in that the rare earth magnet powder is contained in a volume ratio of 85% to 90% with respect to the entire compression-bonded magnet. The compression-bonded magnet with a case is also characterized in that the rare earth magnet powder is an isotropic Nd—Fe—B magnet powder. The compression-bonded magnet with a case is also characterized in that it is a magnet constituting a rotation angle detection sensor for use in a corrosive environment.

The compression-bonded magnet with a case is characterized in: that the case is made of a non-magnetic material; that the compression-bonded magnet is in an approximately columnar shape, and is magnetized in the radial direction of the column; that the case is arranged so as to cover the outer peripheral surface and bottom surface sides of the column; and that the sealing member is arranged on the upper surface side of the column. The compression-bonded magnet with a case is also characterized in that the sealing member is interposed between a part of the column upper surface side of the outer peripheral surface of the compression-bonded magnet and the case.

The compression-bonded magnet with a case is characterized in: that the sealing member is made of a cured product of a thermosetting resin; and that the thermosetting resin binder contained in the compression-bonded magnet and the thermosetting resin are cured in the same step in a state where the compression-bonded magnet is inserted into the case.

(1) In a method for producing a compression-bonded magnet with a case according to the present invention, the compression-bonded magnet with a case comprises a compression-bonded magnet including a rare earth magnet powder and a resin binder of a thermosetting resin, a case for inserting the compression-bonded magnet, and a sealing member, and the compression-bonded magnet is hermetically sealed by the sealing member and the case. The method is characterized by comprising: a green compact molding step of compression-molding a mixture comprising the rare earth magnet powder and the resin binder to form a green compact; a green compact insertion step of inserting the green compact after curing of the resin binder or the green compact before curing of the resin binder into the case; and a sealing step of fixing the sealing member at an insertion opening part for the green compact provided in the case.

(2) The method for producing a compression-bonded magnet with a case is characterized in: that the green compact insertion step involves inserting the green compact before curing of the resin binder into the case; and that the sealing step involves applying a thermosetting resin which serves as the sealing member after curing so as to cover a non-contact part of the green compact with the case while partially contacting the thermosetting resin with the case, in the insertion opening part for the green compact provided in the case and curing the thermosetting resin through heat treatment at a temperature of not lower than the thermosetting initiation temperatures of the thermosetting resin and the resin binder, thereby forming the sealing member while fixing the sealing member onto the case, and, at the same time, curing the resin binder in the green compact, thereby forming the compression-bonded magnet.

The method for producing a compression-bonded magnet with a case is also characterized in that the heat treatment in the sealing step is performed at a temperature of not higher than 200° C. and normal pressure.

The method for producing a compression-bonded magnet with a case is also characterized in: that the rare earth magnet powder is an isotropic Nd—Fe—B magnet powder; and that the magnet powder is contained in a volume ratio of 85% to 90% with respect to the entire compression-bonded magnet.

The production method according to (1) is characterized in: that the case is made of a non-magnetic material; that the green compact and the compression-bonded magnet are in an approximately columnar shape, and are magnetized in the radial direction of the column; that the case is arranged so as to cover the outer peripheral surface and bottom surface sides of the column; and that the sealing member is arranged on the upper surface side of the column.

The production method according to (1) and (2) is characterized in: that the case is made of a non-magnetic material; that the green compact and the compression-bonded magnet are in an approximately columnar shape, and are magnetized in the radial direction of the column; that the case is arranged so as to cover the outer peripheral surface and bottom surface sides of the column; that the sealing member is arranged on the upper surface side of the column; that the green compact has a step part which is in non-contact with the case, at least in the end part on the column upper surface side of its outer peripheral surface; and that the thermosetting resin is charged into the step part in the sealing step, so that a part of the sealing member is formed in the step part.

Advantageous Effect of the Invention

The compression-bonded magnet with a case according to the present invention comprises a compression-bonded magnet including a rare earth magnet powder and a resin binder of a thermosetting resin, a case for inserting the compression-bonded magnet, and a sealing member, and is characterized in: that the compression-bonded magnet is formed by compression-molding a mixture comprising the rare earth magnet powder and the resin binder into a green compact and curing the resin binder in the green compact; that the sealing member is fixed at an insertion opening part for the compression-bonded magnet provided in the case; and that the compression-bonded magnet is hermetically sealed by the sealing member and the case. Therefore, the compression-bonded magnet with a case is inexpensive as compared with the case of using sintered magnets and the like which require heat treatment at a high temperature. Since the compression-bonded magnet with a case has the sealing member fixed, by adhesion or fitting, at the insertion opening part for the compression-bonded magnet provided in the case, the compression-bonded magnet can be completely hermetically sealed in the case, has excellent corrosion resistance, and can be suitably utilized even in a corrosive environment in which it is in direct contact with water, oil, exhaust gas or the like. The compression-bonded magnet itself is not required to have high durability strength by virtue of the above-mentioned sealing structure, and thus it becomes possible to decrease the resin binder amount and increase the rare earth magnet powder amount as compared with not only bonded magnets obtained by injection molding but also typical compression-bonded magnets, thereby improving the magnetic properties. Further, when the resin binder amount is decreased, the compression-bonded magnet itself has poor durability strength. However, the compression-bonded magnet with a case has the above-mentioned sealing structure, and thus can prevent breakage of the magnet, and shows excellent durability strength as a whole.

Since the above-mentioned rare earth magnet powder is contained in a volume ratio of 85% to 90% with respect to the entire compression-bonded magnet, the claimed compression-bonded magnet with a case has higher magnetic properties than those of conventional compression-bonded magnets. This rare earth magnet powder is an isotropic Nd—Fe—B magnet powder, which is an abundant resource as well as an inexpensive material and does not require magnetic field orientation molding by means of an expensive magnetic field molding machine, so that the reduction in production cost can be attained. Also, by virtue of the above-mentioned sealing structure, the compression-bonded magnet can be completely hermetically sealed by the case and the sealing member, so that the deterioration of magnetic properties and rusting due to corrosion can be prevented while an isotropic Nd—Fe—B magnet powder comprising easily oxidizable iron and rare earth elements is used.

The above-mentioned case is made of a non-magnetic material, and the compression-bonded magnet is in an approximately columnar shape and is magnetized in the radial direction of the column. Further, the case is arranged so as to cover the outer peripheral surface and bottom surface sides of the column, and the sealing member is arranged on the upper surface side of the column. Therefore, the case does not adversely affect the magnetic properties. Also, the case does not adversely affect the sensor sensitivity while a thicker molded body than typical coatings is used as the sealing member.

Since the sealing member is interposed between a part of the column upper surface side of the outer peripheral surface of the above-mentioned compression-bonded magnet and the case, excellent adhesion strength between the case and the sealing member can be attained, so that peeling and the like can be prevented. Also, excellent corrosive fluid barrier properties can be attained.

The above-mentioned sealing member is made of a cured product of a thermosetting resin, and the thermosetting resin binder and the thermosetting resin are cured in the same step in a state where the compression-bonded magnet is inserted into the case. Therefore, the step of curing the compression-bonded magnet alone and conventional coating treatment for improvement of corrosion resistance can be deleted, and the production steps and treatment cost can be greatly reduced as compared with the case where these steps and treatment are carried out.

The method for producing a compression-bonded magnet with a case according to the present invention is a method for producing a compression-bonded magnet with a case comprising a compression-bonded magnet including a rare earth magnet powder and a resin binder of a thermosetting resin, a case for inserting the compression-bonded magnet, and a sealing member, wherein the compression-bonded magnet is hermetically sealed by the sealing member and the case, the method comprising (a) a green compact molding step of compression-molding a mixture comprising the rare earth magnet powder and the resin binder to form a green compact; (b) a green compact insertion step of inserting the green compact after curing of the resin binder or the green compact before curing of the resin binder into the case; and (c) a sealing step of fixing the sealing member at an insertion opening part for the green compact provided in the case. Thus, the method can provide the compression-bonded magnet with a case, according to the present invention, having excellent properties as described above.

The green compact insertion step involves inserting the green compact before curing of the resin binder into the case, and the sealing step involves applying a thermosetting resin which serves as the sealing member after curing so as to cover a non-contact part of the green compact with the case while partially contacting the thermosetting resin with the case, in the insertion opening part for the green compact provided in the case; and curing the thermosetting resin through heat treatment at a temperature of not lower than the thermosetting initiation temperatures of the thermosetting resin and the resin binder, thereby forming the sealing member while fixing the sealing member onto the case, and, at the same time, curing the resin binder in the green compact, thereby forming the compression-bonded magnet. Therefore, the compression-bonded magnet and the sealing member can be cured in the same step, and are not needed to be each cured singly. Further, conventional coating treatment for improvement of corrosion resistance can be deleted. Hence, the production steps and treatment cost can be greatly deleted, thereby enabling production of a compression-bonded magnet with a case with high productivity and at low cost.

Since a compression-bonded magnet is adopted as the magnet, the heat treatment at the time of the above-mentioned thermosetting can be performed at a temperature, for example, of not higher than 200° C. and normal pressure, and no heat treatment in a vacuum or at a high temperature is needed. Therefore, the compression-bonded magnet with a case can be produced with higher productivity and at lower cost.

In a structure in which the case is made of a non-magnetic material; the green compact and the compression-bonded magnet are in an approximately columnar shape, and are magnetized in the radial direction of the column; the case is arranged so as to cover the outer peripheral surface and bottom surface sides of the column; and the sealing member is arranged on the upper surface side of the column, the above-mentioned green compact has a step part which is in non-contact with the case, at least in the end part on the column upper surface side of its outer peripheral surface, and the thermosetting resin is charged into the step part in the sealing step, so that a part of the sealing member is formed in the step part. Therefore, the structure has an increased adhesion area between the case and the sealing member and excellent adhesion strength, and peeling and the like can thus be prevented. Also, excellent corrosive fluid barrier properties can be attained.

MODE FOR CARRYING OUT THE INVENTION

Figure 1:
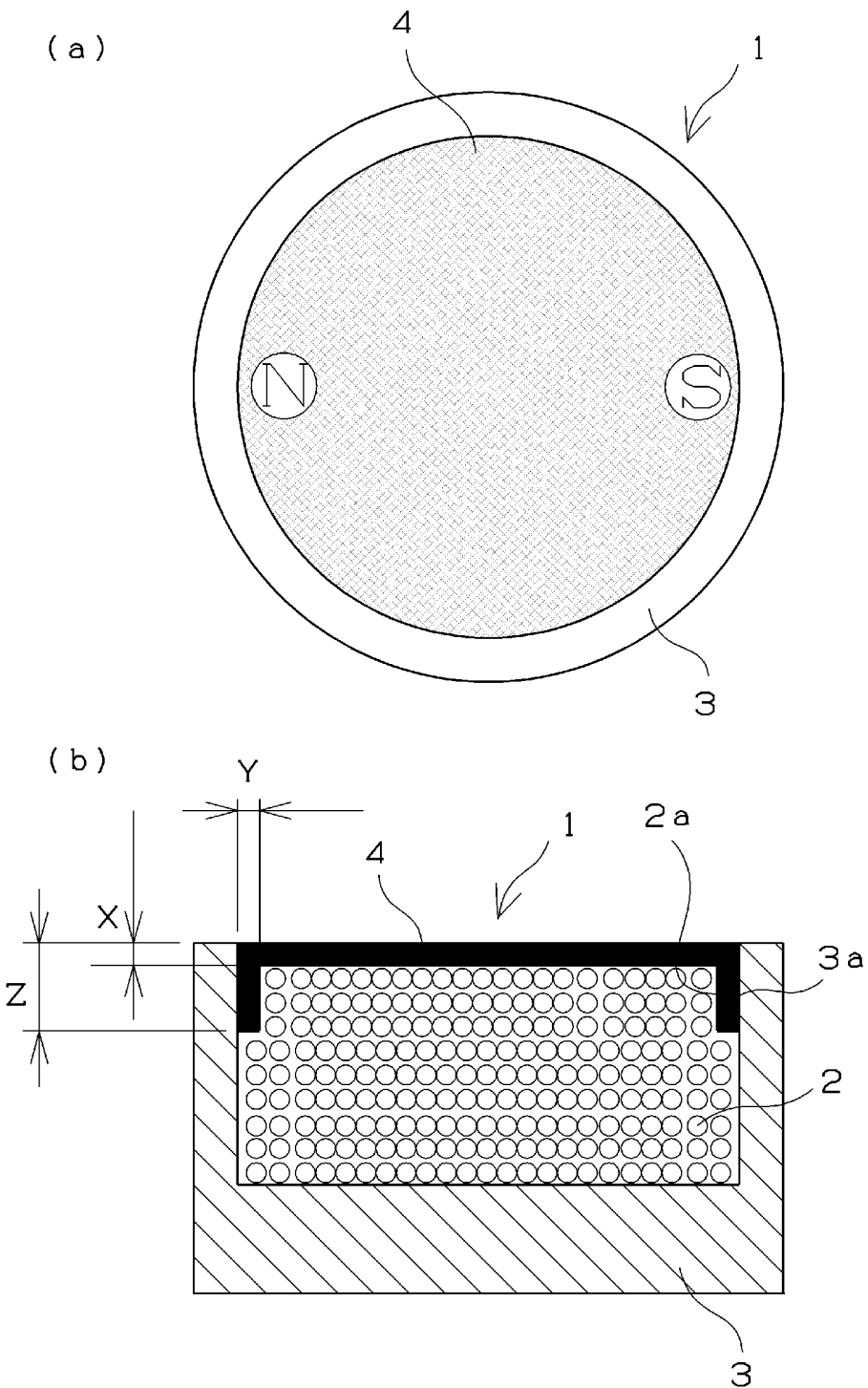
FIG. 1 includes a plan view and a cross sectional view, each showing one example of a compression-bonded magnet with a case according to the present invention.

The compression-bonded magnet with a case according to the present invention will now be described based on FIG. 1. FIG. 1 includes a plan view (FIG. 1(a)) and a cross sectional view (FIG. 1(b)), each showing a compression-bonded magnet with a case. As shown in FIG. 1, a compression-bonded magnet with a case 1 comprises a compression-bonded magnet 2 obtained by compression-molding a mixture comprising a rare earth magnet powder and a resin binder, and a case 3 for inserting the compression-bonded magnet 2. A sealing member 4 is fixed at an insertion opening part 3a for the compression-bonded magnet provided in the case 3, and the compression-bonded magnet 2 is sealed by the sealing member 4 and the case 3. The case 3 is in an approximately cylindrical shape having one opened end surface (insertion opening part 3a) and also having a constant outer diameter thickness.

Figure 2:
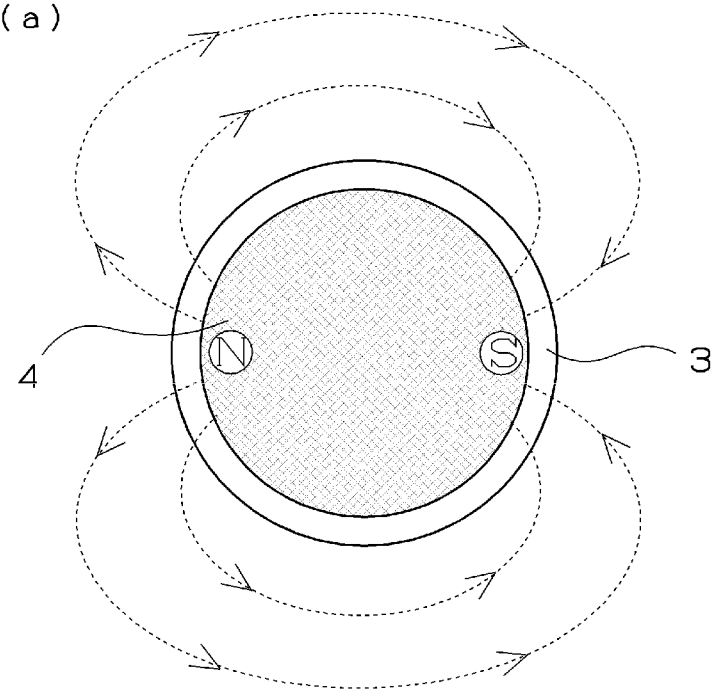
FIG. 2 includes diagrams each showing directions of lines of magnetic force of the compression-bonded magnet with a case shown in FIG. 1.
Figure 2:
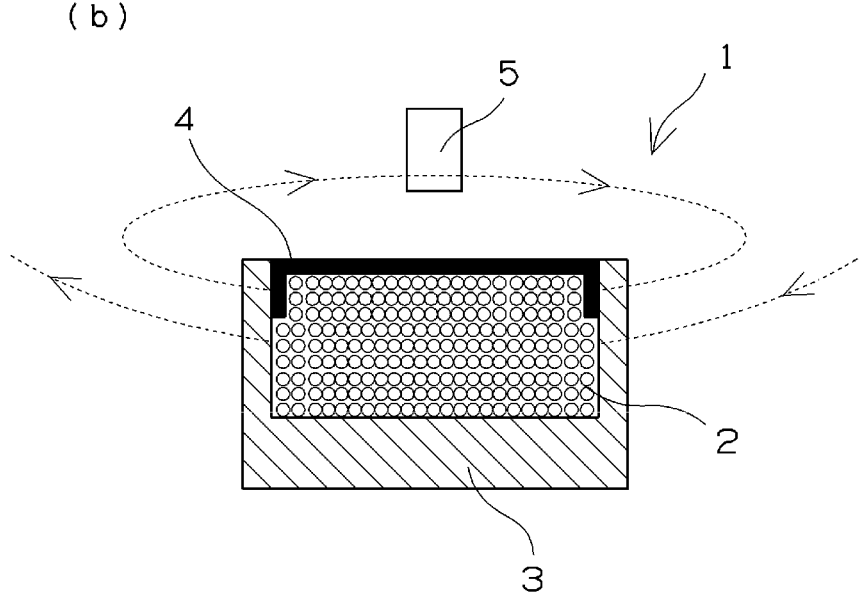

The compression-bonded magnet 2 is in an approximately columnar shape having an approximately circular cross section which is vertical to the axis, is inserted (press-fitted) into the case 3, and is closely contacted with the inner wall surface of the case 3. The compression-bonded magnet 2 is magnetized in the radial direction of the column. Specifically, the compression-bonded magnet 2 is magnetized to the N pole on one side thereof and to the S pole on the other side thereof, when viewed from the center of the radial direction. Here, FIG. 2 schematically shows the directions of lines of magnetic force, with regard to the magnetized state of magnetic fields. As shown in FIG. 2, magnetic fields are formed in an arc shape on a plane vertical to the axis (FIG. 2(a)) and on a vertical plane passing through the axis (FIG. 2(b)). The compression-bonded magnet with a case 1 is fixed on a part of a substance to be rotation-detected, and rotates together with the substance to be rotation-detected. A detection sensor 5 such as an MR sensor is arranged above the compression-bonded magnet with a case 1. Upon rotation of the compression-bonded magnet with a case 1, the intensity of magnetic field to be detected by the detection sensor 5 varies depending on the rotation angle, and the detection sensor 5 detects the rotation angle based on the amount of this change. The detection sensor 5 and the compression-bonded magnet with a case 1 constitute a detection part of a rotation angle sensor.

In the present invention, a magnet comprising a rare earth magnet powder in a volume ratio of 85% to 90% with respect to the entire compression-bonded magnet is preferably used as the compression-bonded magnet. In this case, the resin binder is contained in a volume ratio of about 3% to 10%, and the porosity is about 5% to 10%. These volume ratios are volume proportions of the rare earth magnet powder and the resin binder in the final compression-bonded magnet obtained through compression-molding of these materials (green compact molding) and curing of the resin binder by heat treatment, and are determined by adjusting the weights of the respective materials to be incorporated in consideration of the specific gravities of the respective materials, molding pressure during compression-molding, porosity and the like. Incidentally, conventional compression-bonded magnets comprise a magnet powder in a volume proportion of at most about 83% as described above, typically 75% to 80%, and have a porosity of about 10% to 15%.

The proportions of the rare earth magnet powder and the resin binder to be incorporated are, for example, 0.5% by mass or more and less than 2% by mass for an epoxy resin (including a curing agent) and the remainder for the rare earth magnet powder with respect to the total amount of these components. By employing this range, the volume ratio (85% to 90%) indicated by the above-mentioned suitable range can be attained. Incidentally, typical compression-bonded magnets comprise a resin binder in a proportion of 2% to 3% by mass with respect to the total amount of the rare earth magnet powder and the resin binder. This compression-bonded magnet may comprise minor amounts of other compounding agents such as calcium stearate and boron nitride, for example, for the purpose of improving the compression moldability.

The rare earth magnet powder is contained in a volume proportion of 85% by volume or more with respect to the entire compression-bonded magnet, whereby high magnetic properties can be obtained. The "high magnetic properties" are specifically excellent maximum energy product, residual magnetic flux density, coercive force and the like. When the rare earth magnet powder is contained in a proportion of less than 85% by volume with respect to the entire compression-bonded magnet, there is a possibility that the desired magnetic properties may not be obtained. On the other hand, when the rare earth magnet powder is contained in a proportion of exceeding 90% by volume, the resin binder amount proportionally becomes too low, resulting, for example, in a possibility that the case may be broken when the compression-bonded magnet is press-fitted into the case. The rare earth magnet powder is more preferably contained in a volume ratio of 85% to 88% with respect to the entire compression-bonded magnet. By employing this suitable range, both of the magnetic properties and the material strength can be obtained, thereby providing the advantageous effect of compatibility with automated press-fitting of the compression-bonded magnet into the case.

Any magnet powders can be used as the rare earth magnet powder forming the compression-bonded magnet 2 so long as they can be adopted to produce a rare earth permanent magnet, and examples thereof include Nd—Fe—B-based, Sm—Co-based and other magnet powders. Both of isotropic and anisotropic magnet powders can be used. Among the above-indicated magnet powders, an Nd—Fe—B magnet powder is preferably used because the magnet powder is made of a material which is abundant as a resource and inexpensive, and has high magnetic properties. An isotropic Nd—Fe—B magnet powder is particularly preferably used since the magnet powder does not require magnetic field orientation molding by means of a magnetic field molding machine and can realize improved productivity and a reduced production cost. Here, the isotropic Nd—Fe—B magnet powder used in the present invention has the following contents of the respective components: 27% to 40% by weight for Nd, 60% to 70% by weight for Fe, and 1% to 2% by weight for B, and may comprise other elements including Dy, Tb, Co, Cu, Al, Si, Ga, Nb, V, Pr, Mo, Zr, Ta, Ti, W, Ag, Bi, Zn and Mg in small amounts in order to improve the magnetic properties.

The compression-bonded magnet including a rare earth magnet powder (especially, Nd—Fe—B magnet powder)

comprises easily-oxidizable iron and rare earth elements, and thus is likely to cause deterioration of magnetic properties and rusting due to oxidation corrosion when used in a corrosive environment in a state where its surface is exposed. In the present invention, the compression-bonded magnet is used in a state where it is completely hermetically sealed by the case and the sealing member, and thus this corrosion problem can be avoided.

The average particle diameter of the rare earth magnet powder (measurement value by laser analysis method) is preferably 300 μm or less, more preferably 30 μm to 250 μm. In order to reduce void parts among the particles after compression molding, the grain size distribution preferably has two peaks.

A thermosetting resin is used as the resin binder forming the compression-bonded magnet. Examples of the thermosetting resin include epoxy resins, phenol resins, urea resins and unsaturated polyester resins which are known resin binders for compression-bonded magnets. Among these resins, epoxy resins are preferably used. Also, resins having a curing temperature which is similar to that of the resin used in the sealing member as will be described later are preferably used. For mixing of the rare earth magnet powder and the resin binder, a dry method or wet method can appropriately be selected depending on the type of thermosetting resin.

Any epoxy resins may be used as the resin binder so long as they can be used for adhesion, and resins having a softening temperature of 100° to 120° C. are preferred. For example, there are preferred epoxy resins which are solid (powder) at room temperature, but become pasty at 50° to 60° C., become flowable at 130° to 140° C., and start to cause a curing reaction when further continuously heated. This curing reaction starts also at around 120° C., but the temperature at which the curing reaction finishes within a practical curing time, for example, 2 hours preferably ranges from 170° to 190° C. Within this temperature range, the curing time ranges from 45 to 80 minutes. Such an epoxy resin (including a latent epoxy curing agent) and a rare earth magnet powder are dry-mixed at a temperature of not lower than the softening temperature of the epoxy resin and lower than the thermosetting initiation temperature, so that the uncured epoxy resin can be uniformly coated onto the rare earth magnet powder before compression molding.

Examples of the resin component of the epoxy resin used as the resin binder include bisphenol A-type epoxy resins, bisphenol F-type epoxy resins, bisphenol S-type epoxy resins, hydrogenated bisphenol A-type epoxy resins, hydrogenated bisphenol F-type epoxy resins, stilbene type epoxy resins, triazine backbone-containing epoxy resins, fluorene backbone-containing epoxy resins, alicyclic epoxy resins, novolac type epoxy resins, acryl epoxy resins, glycidyl amine type epoxy resins, triphenol phenol methane type epoxy resins, alkyl-modified triphenolmethane type epoxy resins, biphenyl type epoxy resins, dicyclopentadiene backbone-containing epoxy resins, naphthalene backbone-containing epoxy resins and arylalkylene type epoxy resins.

The curing agent component of the epoxy resin used as the resin binder is preferably a latent epoxy curing agent. Examples of the latent epoxy curing agent include dicyandiamides, boron trifluoride-amine complexes and organic acid hydrazides. Also, a curing promoter such as tertiary amine, imidazole or aromatic amine can be contained together with the latent epoxy curing agent. By using the latent epoxy curing agent, it is possible to set the softening temperature to 100° to 120° C. and the curing temperature to 170° to 190° C., and also to establish a state where the rare earth magnet powder is coated with the epoxy resin (uncured), and, thereafter, to perform compression molding and thermosetting.

The rare earth magnet powder and the resin binder are mixed to form a mixture, and this mixture is compression-molded, thereby forming a green compact. For compression molding (green compact molding), a method comprising charging the above-mentioned mixture into a mold and press-molding the mixture at a predetermined molding pressure can be employed. Any mold may be used in the green compact molding step so long as a molding pressure of 490 to 980 MPa can be applied thereto. Thereafter, the resin binder in the green compact is cured through heat treatment to bind the rare earth magnet powder by means of the resin binder. The heat treatment is performed at a temperature of not lower than the thermosetting initiation temperature of the resin binder (for example, 170° to 190° C. and not higher than 200° C.) for a time during which curing sufficiently proceeds (for example, 45 to 80 minutes). When a compression-bonded magnet is preliminarily completed before insertion thereof into the case, the resin binder may be cured by adjusting the temperature of the mold for compression molding within the above-specified range.

While machining such as cutting or barreling can be applied, according to need, after thermosetting by heat treatment, the compression-bonded magnet exhibits less shrink due to heat treatment as compared with sintered magnets. Therefore, the cost for the machining can be reduced. The magnet according to the present invention has not undergone heat treatment at a high temperature (for example, not lower than 500° C.) such as sintering, and thus can maintain high magnetic properties without causing deterioration of magnetic properties in the production steps, and the production cost can also be reduced.

When the resin binder and the sealing member are cured in the same step, the above-mentioned green compact molding step is performed at a temperature lower than the thermosetting initiation temperature of the resin binder. In this case, the green compact of the compression-bonded magnet is in a state of being sealed by the sealing member (before curing) and the case, and thus heat treatment for curing can be performed in the air. Incidentally, when the compression-bonded magnet is preliminarily completed before insertion thereof into the case, heat treatment is performed in a vacuum atmosphere or an inert gas atmosphere such as nitrogen gas, in order to prevent, for example, oxidative deterioration of the rare earth magnet powder in the green compact. When the epoxy resin (uncured), which is the resin binder, is coated onto the rare earth magnet powder before compression molding, as described above, the rare earth magnet powder and the epoxy resin powder are introduced, for example, into a kneader to dry-mix (knead) them at a temperature of 100° to 120° C. After mixing, the resultant aggregate cake is cooled, pulverized, and then charged into the mold for compression molding and heat treatment, as described above.

The resultant green compact (before curing of the resin binder) or finished product of compression-bonded magnet is inserted into the case. For insertion of the compression-bonded magnet into the case, it is preferably press-fitted so that the case and the compression-bonded magnet can be closely contacted with each other. Any adhesive may be applied between the case and the compression-bonded magnet.

The material for the case 3 is not particularly limited, but is preferably a non-magnetic material because the material does not adversely affect the magnetic properties. In this form, the compression-bonded magnet 2 is in an approximately columnar shape, and is magnetized in the radial direction of the column, and the case 3 is arranged so as to cover the outer peripheral surface and bottom surface sides of the column. Therefore, the lines of magnetic force are in a shape as shown in FIG. 2. The case 3 which covers the outer peripheral surface side of the compression-bonded magnet is made of a non-magnetic material, so that the lines of magnetic force from the compression-bonded magnet are not shut off, thereby making it possible to prevent the deterioration in magnetic properties.

Examples of the non-magnetic material for the case include resin materials, rubber materials and stainless non-magnetic materials such as austenite-based materials. The stainless non-magnetic materials are classified into sintered parts and cut products. Sintered parts are beneficial from the viewpoints of heat resistance, dimensional accuracy, mass productivity and cost, and cut products are beneficial from the viewpoints of heat resistance, dimensional accuracy and strength. When a stainless cut product or the like is used, its surface to be contacted with a sealing member made of a thermosetting resin adhesive or an injection-molded body of resin may be subjected to blasting such as shot sandblasting, machining (surface roughening) or drug solution treatment with an acid or the like, in order to improve the adhesion to the sealing member. A rubber material or resin material, when employed, provides high flexibility in shape design, and, for example, a fitting structure which serves as a stopper after curing of the resin can be easily formed on the case side. Incidentally, the case made of a stainless non-magnetic material or the like is generally expensive and poor in cuttability. Therefore, the case portion preferably has a simple shape and a minimum size which allows the case to hold the compression-bonded magnet, and is connected to a tip end of a common magnetic material shaft or the like.

The sealing member 4 is separate from the case 3, as shown in FIG. 1, and is fixed onto the case 3 after insertion of the compression-bonded magnet 2 into the case 3. The sealing member 4 is in an approximately flat disk shape along the insertion opening part 3a provided in the case 3, has a thickness (X) of 0.1 mm or more, and is different from rust-proof coating films by conventional coating. The material for the sealing member is not particularly limited so long as the compression-bonded magnet can be sealed in the case, and any materials including resin materials and metal materials can be employed. As the means for fixing the sealing member 4 onto the case 3, adhesive fixation, press-fitting fixation, shape fitting fixation by means of a hooking structure, and the like can be adopted depending on the material for or structure of the sealing member 4.

In this form, the compression-bonded magnet 2 is in an approximately columnar shape, and is magnetized in the radial direction of the column, the case 3 is arranged so as to cover the outer peripheral surface and bottom surface sides of the column, and the sealing member 4 is arranged on the upper surface side of the column, as described above. Due to this structure, the lines of magnetic force are in a shape as shown in FIG. 2, and the detection sensor 5 is arranged above the compression-bonded magnet. Due to this shape of the lines of magnetic force, the detection sensor 5 is not made quite adjacent to the magnet surface, but mounted with a gap. The sealing member 4 is a thicker molded body than typical coatings, but can be arranged within this gap range, and thus would not adversely affect, for example, the sensor sensitivity. In order to attain stable adhesion and high corrosion resistance, the thickness (X) of the sealing member 4 preferably ranges from 0.3 mm to 1.0 mm.

The sealing member 4 is preferably made of a resin (resin molded body). Preferable resin molded bodies are those obtained by applying a thermosetting resin adhesive into a thick film and curing the resin adhesive film. No separate adhesive is needed to fix the sealing member onto the case, and the sealing member can be directly fixed by its own adhesion force. The sealing member also has excellent adhesion to the compression-bonded magnet. Further, the thermosetting temperature range is matched with the temperature range of the resin binder (thermosetting resin) contained in the compression-bonded magnet, so that the resin binder in the compression-bonded magnet and the sealing member can be cured by single treatment in the same step. This allows simplification of production steps and reduction in production cost. Additionally, the surface of the sealing member made of a resin may be machined, according to need, after resin application to form a coating and curing.

A preferable structure is such that the sealing member 4 is interposed between a part of the column upper surface side of the outer peripheral surface of the compression-bonded magnet 2 and the case 3. This provides a large bonding area between the case 3 and the sealing member 4 at the edge of the insertion opening part 3a and excellent adhesion strength and corrosive fluid barrier properties. In the structure shown in FIG. 1(b), the column height of the compression-bonded magnet 2 is lowered more than the height of the insertion opening part 3a (this difference constitutes a thickness (X)), and, further, the step part 2a toward the inner diameter side is preliminarily provided in a part of the column upper surface side of the outer peripheral surface of the compression-bonded magnet 2 during compression molding (the axial length of this step part 2a constitutes a thickness (Z), and the radial length thereof constitutes a thickness (Y)). The compression-bonded magnet 2 having this shape is press-fitted into the case 3, and the thermosetting resin adhesive is applied up to the edge of the insertion opening part 3a and thermoset, thereby providing a sealing member 4 which has a structure having the above-mentioned thicknesses (X), (Y) and (Z) and is in an approximately flat disk shape with a flange part. The step part 2a of the compression-bonded magnet 2 serves as a resin pool in the formation of the sealing member of a resin molded body.

The thickness (Y) of the flange part of the sealing member 4 is preferably defined as being equivalent to the thickness (X) of the main body part, for example, about ±20%. The thickness (Z) of the flange part of the sealing member 4 is preferably defined within the range of twice as large as the thickness (X) of the main body part to the height of the insertion opening part 3a. More preferably, the thickness (Z) is twice to four times as large as the thickness (X) of the main body part.

Examples of the thermosetting resin adhesive used in the sealing member include epoxy resin adhesives, phenol resin adhesives and acrylic resin adhesives which are excellent in heat resistance and corrosion resistance. As the epoxy resin, there can be used one-component or two-component epoxy resin adhesives having a resin component similar to that of the resins listed as the above-mentioned resin binder and capable of being diluted with a solvent. Also, amine-based curing agents, polyamide-based curing agents, acid anhydride-based curing agents and the like can also be appropriately used, in addition to the above-mentioned latent epoxy curing agents, as the curing agent in this epoxy resin adhesive. The curing temperature range and curing time are preferably defined as being similar to those for the above-mentioned resin binder. There can be used phenol resin adhesives in which a novolac type phenol resin or a resole type phenol resin used as the resin component and hexamethylenetetramine or the like used as the curing agent are dissolved in a solvent such as methyl ethyl ketone.

The thermosetting resin adhesive is used not for sealing the pores of the green compact, but as a thick-film sealing member, and thus preferably has higher viscosity than that of the adhesive for pore sealing treatment. Specifically, the viscosity (mPa·s) at 25° C. preferably ranges from 100 to 20000 mPa·s, more preferably ranges from 500 to 10000 mPa·s. The viscosity is defined within this range, thereby providing excellent adhesion between the case and the magnet. Also, it is possible to suppress the amount of the adhesive penetrating into the voids of the magnet which is a green compact and to easily form a sealing member having the desired film thickness on the surface of the magnet. Known methods such as spray coating and dispenser coating can be employed for applying the thermosetting resin adhesive onto the magnet surface. Highly-viscous adhesives can be used, and dispenser coating is preferably employed because this method can easily realize thick film formation and also can eliminate the waste of coating materials.

The member to which the uncured thermosetting resin adhesive has been applied is subjected to heat treatment to cure the adhesive. The heat treatment is performed at a temperature of not lower than the thermosetting initiation temperature of the thermosetting resin adhesive (for example, 170° to 190° C. and not higher than 200° C.) for a time during which curing sufficiently proceeds (for example, 1 hour) in a state where the member is put in a dryer or the like. For simplification of production steps and the like, the curing temperature range and curing time are matched with those for the above-mentioned resin binder, and the resin binder contained in the compression-bonded magnet and the sealing member are preferably cured at the same time in this step.

There may be an embodiment in which the case into which the compression-bonded magnet has been inserted is arranged within the mold and the sealing member is provided thereon by injection molding (insert molding) of a resin composition. For example, thermoplastic resins which can be injection-molded can be used as the resin. Examples of such thermoplastic resins include polyolefin resins such as polyethylene resins and polypropylene resins, polyphenylene sulfide (PPS) resins, liquid crystal polymers, polyether ether ketone (PEEK) resins, polyimide resins, polyether imide resins, polyacetal resins, polyether sulfone resins, polycarbonate resins, polyethylene terephthalate resins, polybutylene terephthalate resins, polyphenylene oxide resins, polyphthalamide resins, polyamide resins or mixtures thereof. Among these resins, PPS resins or PEEK resins which are excellent in corrosion resistance and heat resistance are preferred. Also, this resin composition may comprise any compounding agent within such a range as not to deteriorate the function as the sealing member. Known method, conditions and mold for injection molding can be employed depending on the kind of resin.

Additionally, when a sealing member made of a resin molded body is provided, a structure which serves as a stopper after curing of the resin is preferably provided on the case side.

Figure 3:
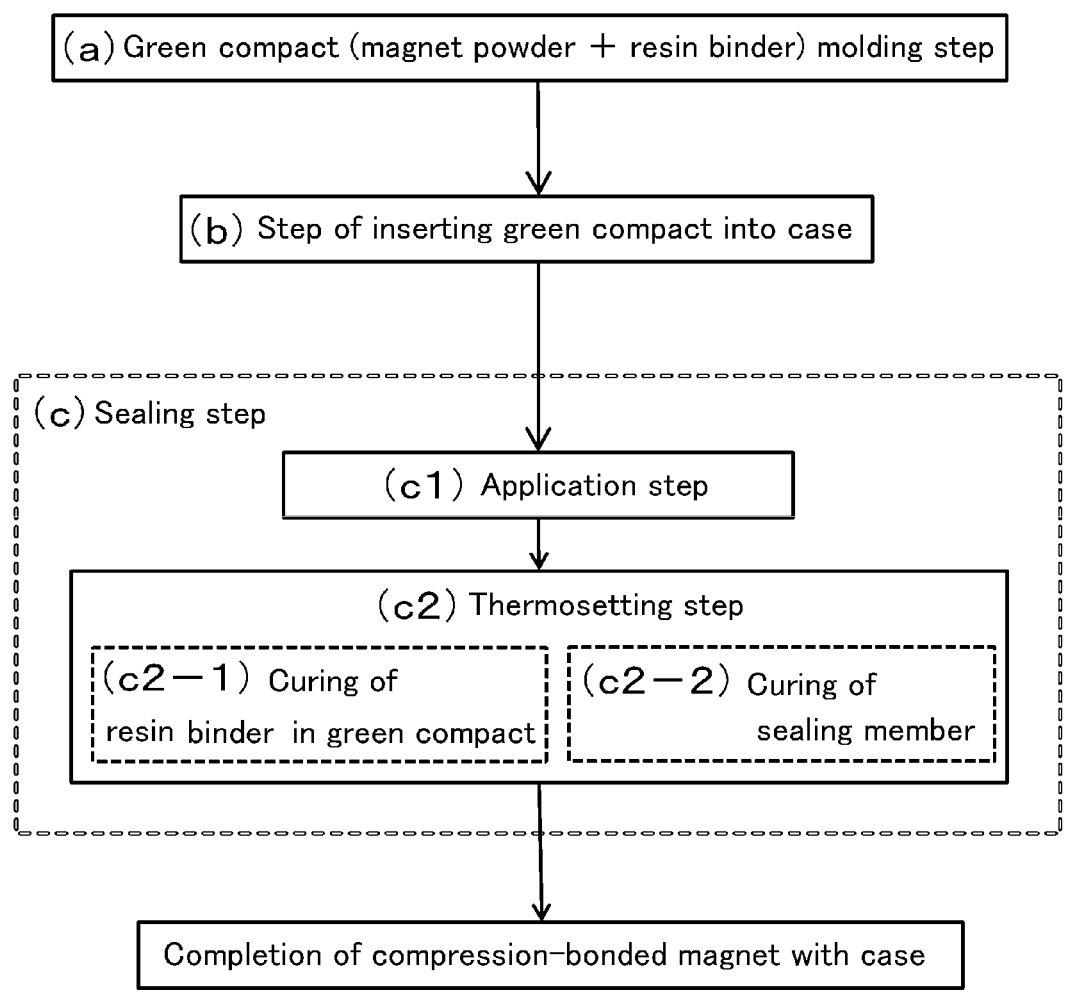
FIG. 3 is a flow chart of steps for producing the compression-bonded magnet with a case according to the present invention.
Figure 4:
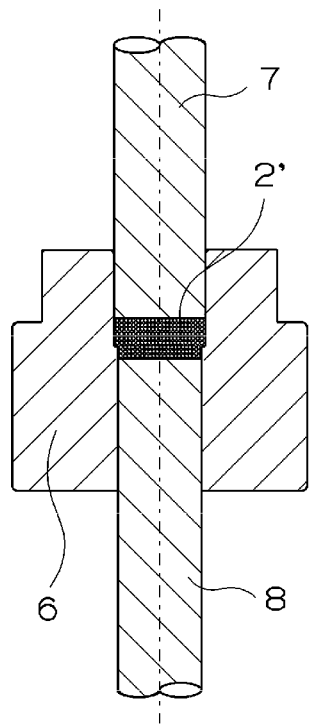
FIG. 4 shows one example of the steps for producing the compression-bonded magnet with a case according to the present invention.
Figure 4:
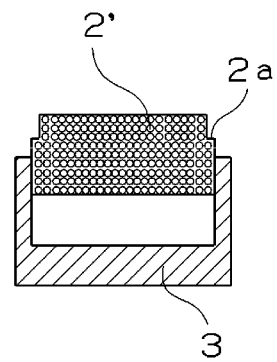
Figure 4:
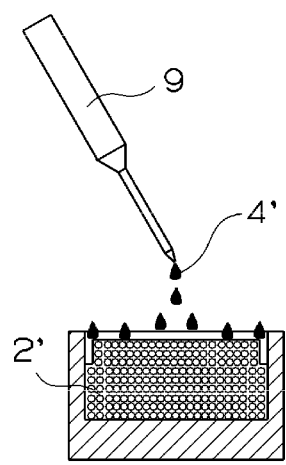
Figure 4:
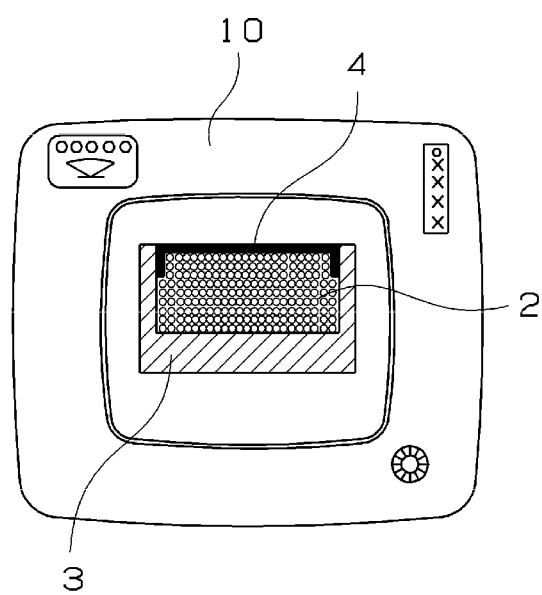

A method for producing the compression-bonded magnet with a case according to the present invention will now be described based on FIGS. 3 and 4. FIG. 3 is a flow chart of steps for producing the compression-bonded magnet with a case according to the present invention. FIG. 4 shows one specific example of the production steps. The method for producing the compression-bonded magnet with a case according to the present invention is a method for producing a compression-bonded magnet with a case comprising a compression-bonded magnet including a rare earth magnet powder and a resin binder of a thermosetting resin, a case for inserting the compression-bonded magnet, and a sealing member, wherein the compression-bonded magnet is hermetically sealed by the sealing member and the case.

This production method comprises at least three steps, specifically, a green compact molding step (a) of compression-molding a mixture comprising the rare earth magnet powder and the resin binder to form a green compact; a green compact insertion step (b) of inserting the green compact after curing of the resin binder (finished product as the compression-bonded magnet) or the green compact before curing of the resin binder into the case; and a sealing step (c) of fixing the sealing member at an insertion opening part for the green compact provided in the case. FIGS. 3 and 4 show the case where the compression-bonded magnet and the sealing member made of a thermosetting resin are cured at the same time in the sealing step (c) and this step includes an application step (c1) and a thermosetting step (c2) as specific procedures for fixing the sealing member. The respective steps will be described below.

[(a) Green Compact Molding Step]

A mixture comprising a rare earth magnet powder and a resin binder is compression-molded. For example, the mixture of the rare earth magnet powder and the resin binder is put in a die 6 as shown in FIG. 4(a), and is compressed by an upper punch 7 and a lower punch 8 to form a green compact 2' (before curing). For mixing of the rare earth magnet powder and the resin binder, a dry method or wet method can appropriately be selected depending on the type of thermosetting resin of the resin binder. For example, mixing is performed by using a mixer such as a blender or a kneader. The molding mold, rare earth magnet powder, resin binder, curing agent component of the resin binder, etc., which are used in this production method, are as described above.

For example, the case where a latent epoxy curing agent is used as the curing agent component of the epoxy resin used as the resin binder is described. In this green compact molding step, firstly, the rare earth magnet powder and the epoxy resin which is the resin binder are thoroughly mixed at room temperature by means of a blender or the like. Then, the resultant mixture is introduced into a mixer such as a kneader to be heated and mixed at the softening temperature (100° to 120° C.) of the epoxy resin. This heating/mixing step brings a state where the uncured epoxy resin is uniformly coated (covered) onto the surface of the rare earth magnet powder. Since the content heated and mixed by means of the mixer such as a kneader is in an aggregated cake-like shape, this aggregate cake is pulverized at room temperature, for example, by a Henschel mixer and sieved, thereby providing a rare earth magnet powder whose surface is coated with the epoxy resin (uncured) which is the resin binder. A mixture of the rare earth magnet powder and the resin binder in such a state is compression-molded to form a green compact. This makes it possible to reduce the segregation of the magnet powder and resin binder powder which are different in specific gravity and to improve the compressibility at the time of green compact molding and the durability of the magnet itself as compared with the case where the rare earth magnet powder and the resin binder powder are simply mixed, even when the resin binder amount is smaller than usual.

[(b) Green Compact Insertion Step]

The green compact obtained in the green compact molding step is inserted into the case, as shown in FIG. 4(b). For insertion of the compression-bonded magnet into the case, it is preferably press-fitted so that the case and the compression-bonded magnet can be closely contacted with each other. Any adhesive may be applied between the case and the compression-bonded magnet.

[(c) Sealing Step—(c1) Application Step]

In the insertion opening part for the green compact provided in the case, a thermosetting resin which serves as the sealing member after curing is applied so as to cover a non-contact part of the green compact with the case while the thermosetting resin is partially contacted with the case. Specifically, as shown in FIG. 4(c), after insertion or press-fitting of the green compact 2' into the case, the thermosetting resin adhesive is applied from the insertion opening part side of the case 3 by using a dispenser, thereby providing a member in a state where an uncured sealing member 4' is applied to the case 3 and the green compact 2'.

The thermosetting resin adhesive is used as a material for the sealing member, and the thermosetting temperature range thereof is matched with the temperature range of the resin binder (thermosetting resin) contained in the compression-bonded magnet, so that the curing (c2-1) of the resin binder contained in the compression-bonded magnet and the curing (c2-2) of the sealing member can be performed simultaneously through single treatment (c2) in the sealing step. Additionally, the surface of the sealing member made of a resin may be machined, according to need, after resin application to form a coating and curing.

[(c) Sealing Step—(c2) Thermosetting Step]

The member in a state where the uncured thermosetting resin adhesive has been applied is subjected to heat treatment to cure the adhesive (c2-2). As shown in FIG. 4(d), the heat treatment is performed at a temperature of not lower than the thermosetting initiation temperatures of the resin binder contained in the green compact and the thermosetting resin adhesive (for example, 170° to 190° C. and not higher than 200° C.) and normal pressure for a time during which curing sufficiently proceeds in a state where the member is put in a dryer 10. The curing temperature ranges and curing times of the resin binder contained in the green compact and the thermosetting resin adhesive are matched depending, for example, on the materials selected therefor. The temperature of not lower than thermosetting initiation temperatures of the resin binder and the thermosetting resin adhesive is not higher than 200° C., for example, 170° to 190° C. The time during which curing sufficiently proceeds is, for example, 45 to 80 minutes.

By virtue of this, the resin binder contained in the green compact is cured, and the rare earth magnet powder is bound by the binder to form the compression-bonded magnet 2 (c2-1). At the same time, the sealing member 4 is cured and formed while it is fixed onto the case 3 and the compression-bonded magnet 2 (c2-2), thereby providing a compression-bonded magnet with a case comprising the compression-bonded magnet 2, case 3 and sealing member 4 which are integrally formed. Finally, the compression-bonded magnet 2 is magnetized in the radial direction, thereby forming a finished product.

In the embodiment described based on FIGS. 3 and 4 above, the step of curing the compression-bonded magnet and the step of curing the sealing step can be performed in the same step, thereby making it possible to greatly reduce the production steps and the treatment cost, and to produce a compression-bonded magnet with high productivity and at low cost. Also, the heat treatment in the sealing step can be carried out at a temperature of not higher than 200° C. and normal pressure (in the air), and no heat treatment in a vacuum or at a high temperature is needed. Therefore, the compression-bonded magnet with a case can be produced with higher productivity and at lower cost.

As another embodiment of the compression-bonded magnet in the green compact insertion step, the resin binder contained in the green compact may also be cured to complete the compression-bonded magnet before insertion thereof into the case. As an additional embodiment of the sealing member in the sealing step, the sealing member may also be preliminarily provided as a molded body which is made of a metal or resin and is separate from the case, and fixed onto this case after insertion of the green compact (or compression-bonded magnet) into the case. Further, there may be an embodiment in which the case into which the green compact (or the compression-bonded magnet) has been inserted is arranged within the mold and the sealing member is provided thereon by injection molding (insert molding) of a resin composition, as described above.

INDUSTRIAL APPLICABILITY

The compression-bonded magnet with a case according to the present invention can realize high magnetic properties, high corrosion resistance and high durability strength even at low cost, and thus can be utilized as a sensor magnet of angle detection sensors for use in various fields including automobile field and industrial machine field. Especially, it can be suitably utilized as a sensor magnet for sensors used in a corrosive environment in which they are in contact with a fluid such as water, oil or exhaustive gas and are required to have corrosion resistance, for example, rotation angle detection sensors in flow channel switching valves for cooling water, oil pump opening/closing angle detection sensors and opening/closing angle detection sensors for fuel pumps.

EXPLANATION OF REFERENCE NUMERALS AND SYMBOLS

1. Compression-bonded magnet with case
2. Compression-bonded magnet
2'. Green compact
3. Case
4. Sealing member
4'. Uncured sealing member
5. Detection sensor
6. Die
7. Upper punch
8. Lower punch
9. Dispenser
10. Dryer

The invention claimed is:

1. A compression-bonded magnet with a case, comprising a compression-bonded magnet including a rare earth magnet powder and a resin binder of a thermosetting resin, a case for inserting the compression-bonded magnet, and a sealing member, wherein
    the compression-bonded magnet is formed by compression-molding a mixture comprising the rare earth magnet powder and the resin binder into a green compact and curing the resin binder contained in the green compact, the sealing member is fixed at an insertion opening part for the compression-bonded magnet provided in the case, the compression-bonded magnet is hermetically sealed by the sealing member and the case, and the case is a sintered part made of a non-magnetic material.

2. The compression-bonded magnet with a case according to claim 1, wherein the rare earth magnet powder is contained in a volume ratio of 85% to 90% with respect to the entire compression-bonded magnet.

3. The compression-bonded magnet with a case according to claim 1, wherein the rare earth magnet powder is an isotropic Nd—Fe—B magnet powder.

4. The compression-bonded magnet with a case according to claim 1, wherein the compression-bonded magnet is in an approximately columnar shape, and is magnetized in the radial direction of the column, the case is arranged so as to cover the outer peripheral surface and bottom surface sides of the column, and the sealing member is arranged on the upper surface side of the column.

5. The compression-bonded magnet with a case according to claim 4, wherein the sealing member is interposed between a part of the column upper surface side of the outer peripheral surface of the compression-bonded magnet and the case.

6. The compression-bonded magnet with a case according to claim 1, wherein the sealing member is made of a cured product of a thermosetting resin, and the resin binder and the sealing member are cured in the same step in a state where the green compact is inserted into the case.

7. The compression-bonded magnet with a case according to claim 1, which is a magnet constituting a rotation angle detection sensor for use in a corrosive environment.

8. A method for producing a compression-bonded magnet with a case comprising a compression-bonded magnet including a rare earth magnet powder and a resin binder of a thermosetting resin, a case for inserting the compression-bonded magnet, and a sealing member, wherein the compression-bonded magnet is hermetically sealed by the sealing member and the case and wherein the case is a sintered part made of a non-magnetic material, the method comprising:

a green compact molding step of compression-molding a mixture comprising the rare earth magnet powder and the resin binder to form a green compact;

a green compact insertion step of inserting the green compact after curing of the resin binder or the green compact before curing of the resin binder into the case; and a sealing step of fixing the sealing member at an insertion opening part for the green compact provided in the case.

9. The method for producing a compression-bonded magnet with a case according to claim 8, wherein the green compact insertion step involves inserting the green compact before curing of the resin binder into the case, and the sealing step involves:

applying a thermosetting resin which serves as the sealing member after curing so as to cover a non-contact part of the green compact with the case while partially contacting the thermosetting resin with the case, in the insertion opening part for the green compact provided in the case; and curing the thermosetting resin through heat treatment at a temperature of not lower than the thermosetting initiation temperatures of the thermosetting resin and the resin binder, thereby forming the sealing member while fixing the sealing member onto the case, and, at the same time, curing the resin binder contained in the green compact, thereby forming the compression-bonded magnet.

10. The method for producing a compression-bonded magnet with a case according to claim 9, wherein the green compact and the compression-bonded magnet are in an approximately columnar shape, and are magnetized in the radial direction of the column, the case is arranged so as to cover the outer peripheral surface and bottom surface sides of the column, the sealing member is arranged on the upper surface side of the column, the green compact has a step part which is in non-contact with the case, at least in the end part on the column upper surface side of its outer peripheral surface, and the thermosetting resin is charged into the step part in the sealing step, so that a part of the sealing member is formed in the step part.

11. The method for producing a compression-bonded magnet with a case according to claim 9, wherein the heat treatment in the sealing step is performed at a temperature of not higher than 200° C. and normal pressure.

12. The method for producing a compression-bonded magnet with a case according to claim 8, wherein the green compact and the compression-bonded magnet are in an approximately columnar shape, and are magnetized in the radial direction of the column, the case is arranged so as to cover the outer peripheral surface and bottom surface sides of the column, and the sealing member is arranged on the upper surface side of the column.

13. The method for producing a compression-bonded magnet with a case according to claim 8, wherein the rare earth magnet powder is an isotropic Nd—Fe—B magnet powder, and the magnet powder is contained in a volume ratio of 85% to 90% with respect to the entire compression-bonded magnet.

* * * * *